US009579729B2

(12) United States Patent
Pacheri

(10) Patent No.: US 9,579,729 B2
(45) Date of Patent: Feb. 28, 2017

(54) CUTTING INSERT WITH ASYMMETRIC CHIP FORMER

(71) Applicant: Kennametal India Limited, Bangalore (IN)

(72) Inventor: Sreekala Pacheri, Pune (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 211 days.

(21) Appl. No.: 14/196,053

(22) Filed: Mar. 4, 2014

(65) Prior Publication Data

US 2014/0248098 A1    Sep. 4, 2014

(30) Foreign Application Priority Data

Mar. 4, 2013 (IN) .............................. 923/CHE/2013

(51) Int. Cl.
*B23B 27/00* (2006.01)
*B23B 27/16* (2006.01)
*B23B 27/14* (2006.01)

(52) U.S. Cl.
CPC ........ B23B 27/1611 (2013.01); B23B 27/143 (2013.01); B23B 27/1607 (2013.01); *B23B 2200/0447* (2013.01); *B23B 2200/081* (2013.01); *Y10T 407/23* (2015.01); *Y10T 407/235* (2015.01)

(58) Field of Classification Search
CPC ...... B23B 2200/0447; B23B 2200/081; B23B 27/143; B23B 27/1607; B23B 27/1611; Y10T 407/23; Y10T 407/235; Y10T 407/24; Y10T 407/245

USPC .................................................. 407/113–116
See application file for complete search history.

(56) References Cited

U.S. PATENT DOCUMENTS

| 4,486,127 A * | 12/1984 | Eckle .................... B23B 27/141 407/114 |
| 4,681,487 A | 7/1987 | Pettersson |
| 5,082,401 A | 1/1992 | Niebauer |
| 5,791,833 A * | 8/1998 | Niebauer .............. B23B 27/141 407/114 |
| 5,803,674 A * | 9/1998 | Satran .................. B23B 27/143 407/113 |
| 5,947,651 A * | 9/1999 | Murakami ............ B23B 27/143 407/114 |
| 6,146,065 A * | 11/2000 | Isaksson .................. B23B 5/12 407/113 |
| 6,234,726 B1 | 5/2001 | Okada et al. |

(Continued)

FOREIGN PATENT DOCUMENTS

JP        09207007 A  *  8/1997
JP        10217008 A  *  8/1998

*Primary Examiner* — Sunil K Singh
*Assistant Examiner* — Nicole N Ramos
(74) *Attorney, Agent, or Firm* — Ian K. Samways

(57) ABSTRACT

A cutting insert includes a top surface, a bottom surface and a plurality of peripheral side surfaces. The top and bottom surfaces and the side surfaces are joined to form rounded cutting corners. A plurality of cutting edges are formed at an intersection between the top surface and the plurality of side surfaces. A pair of asymmetric chip formers are proximate opposite rounded cutting corners. A distance between the opposite rounded cutting corners and the asymmetric chip formers varies in such a way that a ratio of a chip thickness and the distance is substantially constant as a function of a depth of cut.

19 Claims, 5 Drawing Sheets

(56) References Cited

U.S. PATENT DOCUMENTS

| | | | |
|---|---|---|---|
| 6,293,738 B1 * | 9/2001 | Hartlohner | B23B 27/065 407/114 |
| 6,786,682 B1 * | 9/2004 | Wiman | B23B 27/143 407/114 |
| 7,118,312 B2 | 10/2006 | Norström et al. | |
| 2002/0127068 A1 * | 9/2002 | Kinukawa | B23B 27/145 407/113 |
| 2007/0116531 A1 * | 5/2007 | Okita | B23B 27/143 407/114 |
| 2008/0232912 A1 * | 9/2008 | Bhagath | B23C 5/06 407/114 |
| 2010/0028092 A1 * | 2/2010 | Choi | B23C 5/202 407/40 |
| 2010/0221076 A1 * | 9/2010 | Takahashi | B23C 5/06 407/42 |
| 2011/0033252 A1 | 2/2011 | Nishida | |
| 2011/0305534 A1 * | 12/2011 | Park | B23B 27/141 407/100 |
| 2012/0051855 A1 * | 3/2012 | Lof | B23B 27/143 407/114 |
| 2012/0177452 A1 | 7/2012 | Konta | |

\* cited by examiner

CUTTING INSERT WITH ASYMMETRIC CHIP FORMER

CLAIM TO PRIORITY

This application is a National entry application of Indian Application No. 923/CHE/2013, filed on Mar. 4, 2013, the entire contents of which is incorporated herein by reference.

BACKGROUND OF THE INVENTION

The invention relates in general to a cutting insert that may be detachably mounted on a tool holder for cutting a workpiece, and in particular to a cutting insert for performing an external or internal turning operation on a workpiece with an asymmetric chip former for superior chip control at depth of cuts lower than the rounded cutting corner of the cutting insert.

In a typical turning operation, the thickness of the chip varies along the cutting corner or nose radius of the cutting insert. At low depths of cut, chip control becomes even more challenging due to narrow and thin chips.

SUMMARY OF THE INVENTION

The problem of chip formation at low depths of cut is solved by providing a cutting insert including an asymmetric chip former proximate a rounded cutting corner that takes into account varying thickness and the flow angle of the chip by varying a distance between the cutting corner and the chip former accordingly.

In one aspect of the invention, a cutting insert comprises a top surface, a bottom surface and a plurality of peripheral side surfaces. The top and bottom surfaces and two of the side surfaces being joined to form a rounded cutting corner. A plurality of cutting edges are formed at an intersection between the top surface and the plurality of side surfaces. An asymmetric chip former is proximate the rounded cutting corner. A distance between the rounded cutting corner and the asymmetric chip former along a bisector passing through a central axis is greater than a distance between the rounded cutting corner and the asymmetric chip former proximate one of the plurality of cutting edges extending from one end of the cutting corner, and less than a distance between the the rounded cutting corner and the asymmetric chip former proximate another one of the plurality of cutting edges extending from the other end of the cutting corner.

In another aspect of the invention, a cutting insert comprises a top surface, a bottom surface and a plurality of peripheral side surfaces. The top and bottom surfaces and two of the side surfaces being joined to form a rounded cutting corner. A plurality of cutting edges are formed at an intersection between the top surface and the plurality of side surfaces. A pair of asymmetric chip formers are proximate opposite rounded cutting corners, wherein a distance between the opposite rounded cutting corners and the chip formers varies in such a way that a ratio of a chip thickness and the distance is substantially constant as a function of a depth of cut.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
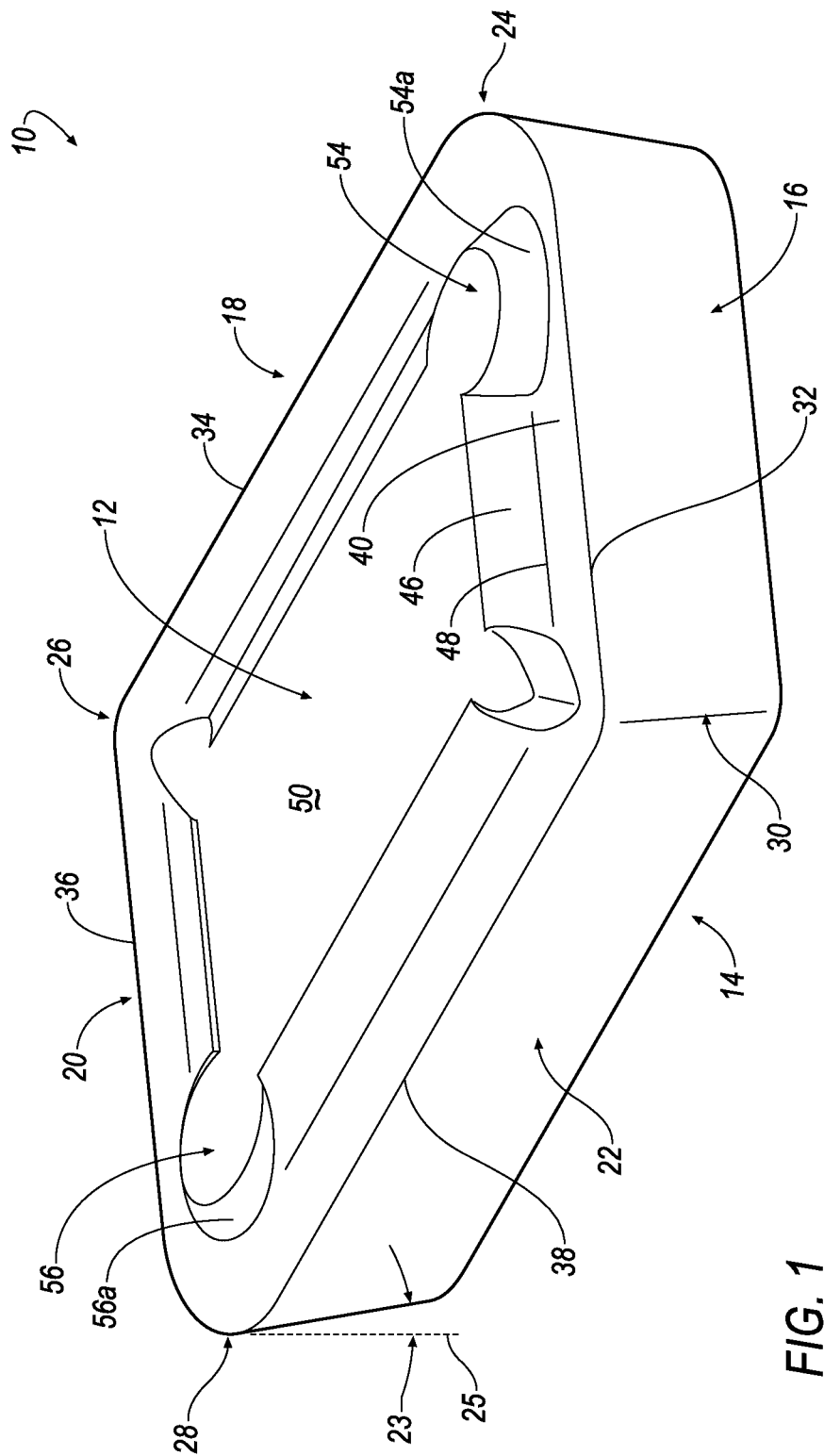
FIG. 1 shows a perspective view of an indexable cutting insert with asymmetric chip formers according to an embodiment of the invention.
Figure 2:
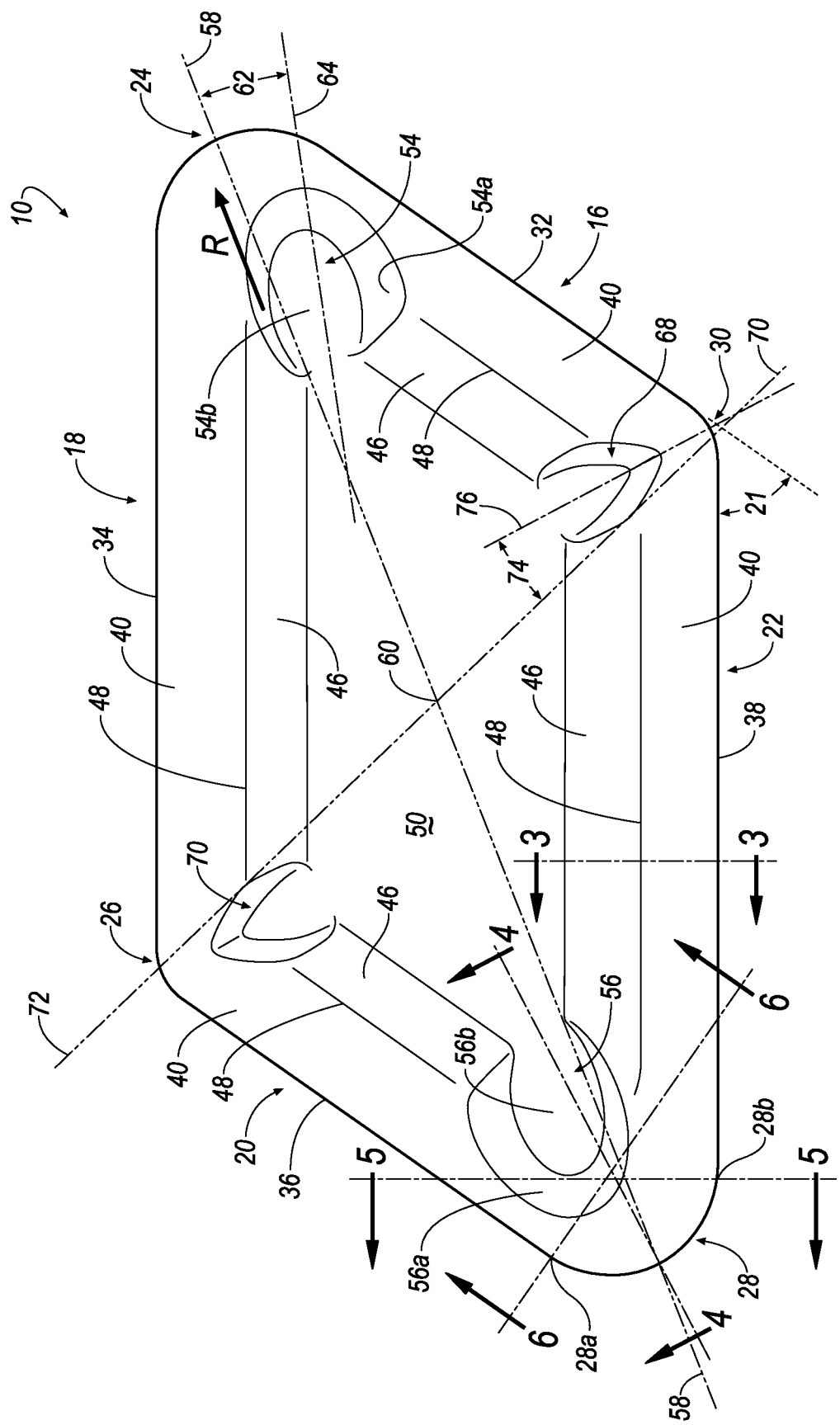
FIG. 2 shows a top view of the indexable cutting insert of FIG. 1.

Referring now to FIGS. 1 and 2, an indexable cutting insert 10 is shown according to an embodiment of the invention. In general, the cutting insert 10 is generally a parallelogram in shape having substantially parallel top and bottom surfaces 12, 14, respectively, and peripheral side surfaces 16, 18, 20, 22. The peripheral side surface 22 is formed at an acute angle 21 with respect to the peripheral side surface 16, as shown in FIG. 1. In other words, a plane parallel to the peripheral side surface 22 intersects a plane parallel to the peripheral sides surface 22 at the the acute angle 21. Because of the cutting insert 10 is generally a parallelogram in shape, the opposite peripheral side surface 20 is formed at the same acute angle 21 with respect to the peripheral side surface 18. It will be understood that the peripheral side surface 18 is formed at an obtuse angle with respect to the peripheral side surface 16 and the opposite peripheral side surface 22 is formed at an obtuse angle with respect to the peripheral side surface 20.

The peripheral side surfaces 16, 18, 20, 22 are formed at a clearance angle 23 with respect to a plane 25 perpendicular to the top and bottom surfaces 12, 14, as shown in FIG. 1. The clearance angle 23 can be in a range between about 0 degrees to about 30 degrees. In one embodiment, the clearance angle 23 is about 15 degrees. The top and bottom surface 12, 14 and the side surfaces 16, 18, 20, 22 are joined to define rounded cutting corners 24, 26, 28, 30 (or nose radius) formed by a radius, R. For example, the rounded cutting corner 24 (or nose radius 24) is formed between the top and bottom surfaces 12, 14 and the side surfaces 16, 18. Likewise, the rounded cutting corners 26, 28 and 30 are formed between the top and bottom surfaces 12, 14 and the side surfaces 18, 20 and 22. Because of the cutting insert 10 is generally a parallelogram in shape, it will be appreciated that the cutting corners 24 and 28 are substantially identical to each other, and that the cutting corners 26 and 30 are substantially identical to each other.

A plurality of cutting edges 32, 34, 36, 38 are formed at the intersection between the top surface 12 and the side surfaces 16, 18, 20, 22. In the illustrated embodiment, the cutting edges 32, 36 are substantially parallel to each other, while the cutting edges 34, 38 are substantially parallel to each other. It will be appreciated that the cutting corners 24, 26, 28, 30 and the cutting edges 32, 34, 36, 38 can be formed with a radius. Although a generally parallelogram-shaped cutting insert is illustrated, it will also be appreciated that the principles of the invention can be applied to a cutting insert having any polygonal shape, such as a triangle, a square, a rectangle, a pentagon, a hexagon, an octagon, and the like.

Figure 3:
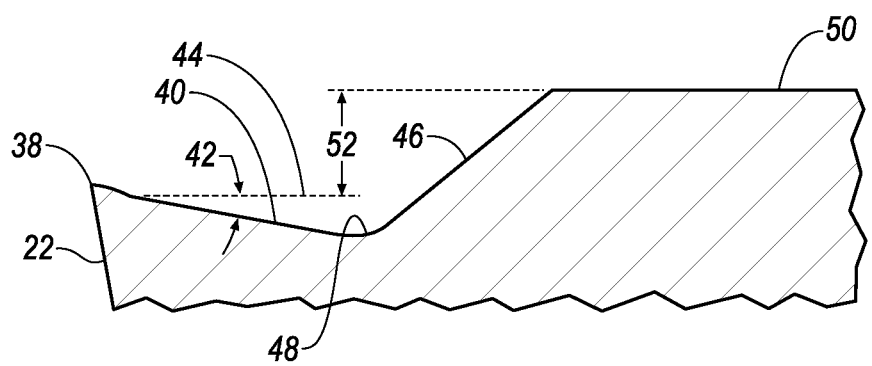
FIG. 3 shows a cross-sectional view of the cutting insert taken along line 3-3 of FIG. 2.

The top surface 12 has a rake face 40 that extends entirely around the periphery of the cutting insert 10. As shown in FIG. 3, the rake face 40 slopes inwardly and downwardly from both the rounded corners 24, 26, 28, 30 and the cutting edges 32, 34, 36, 38 at a non-zero angle 42 with respect to a plane 44 parallel to the top surface 12. In one embodiment, the angle 42 is in a range between about 5 degrees to about 15 degrees. For example, the angle 42 can be about 10 degrees. A back wall 46 extends upwardly from a bottom 48 to a central, substantially planar plateau 50 of the top surface 12 of the cutting insert 10. The central plateau 50 is higher in elevation than the cutting corners 24, 26, 28, 30 and the cutting edges 32, 34, 36, 38 by a height 52. In one embodiment, the height 52 is in a range between about 0.003 inch (0.08 mm) to about 0.005 inch (0.12 mm). The downward sloping rake face 40 and upward sloping back wall 46 facilitate desired chip formation during a machining operation.

Referring back to FIGS. 1 and 2, one aspect of the invention is that the top surface 12 of the cutting insert 10 includes an asymmetric chip former, shown generally at 54, 56, proximate the opposite rounded cutting corners 24, 28, respectively. In the illustrated embodiment, each asymmetric chip former 54, 56 is identical to each other and is defined by an upward sloping arcuate side wall 54a, 56a that rises from the rake face 40 to a portion of the central plateau 50 that forms a top surface 54b, 56b of the chip former 54, 56. In the illustrated embodiment, a bisector 58 passing through the opposite rounded corners 24, 28 and through a central axis 60 of the cutting insert 10 forms a non-zero angle 62 with respect to a bisector 64 passing through the chip former 54 (and also the chip former 56). As a result, the chip formers 54, 56 are asymmetric with respect to the cutting corners 24, 28, respectively, as shown in FIGS. 1 and 2.

Figure 4:
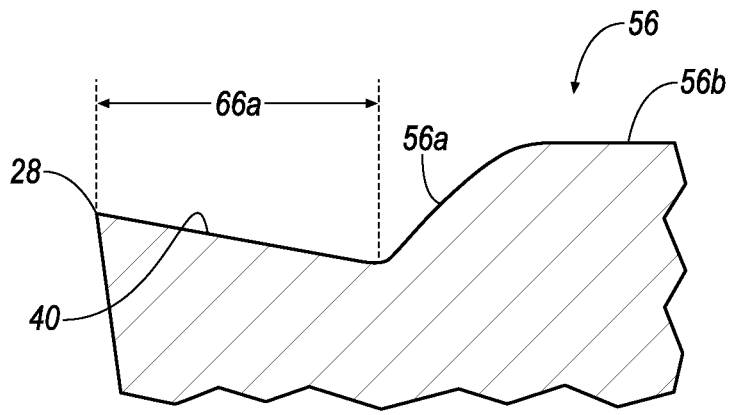
FIG. 4 shows a cross-sectional view of the cutting insert taken along line 4-4 of FIG. 2.
Figure 5:
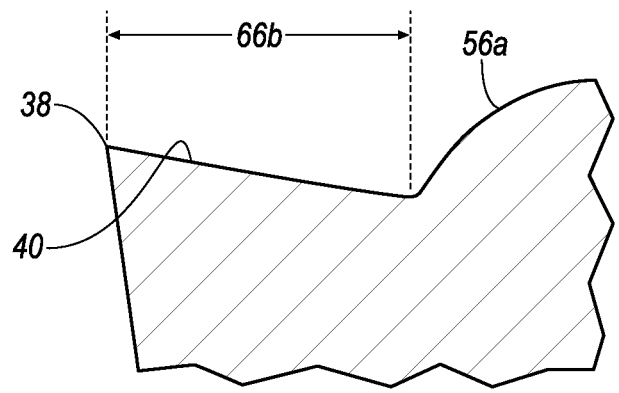
FIG. 5 shows a cross-sectional view of the cutting insert taken along line 5-5 of FIG. 2.
Figure 6:
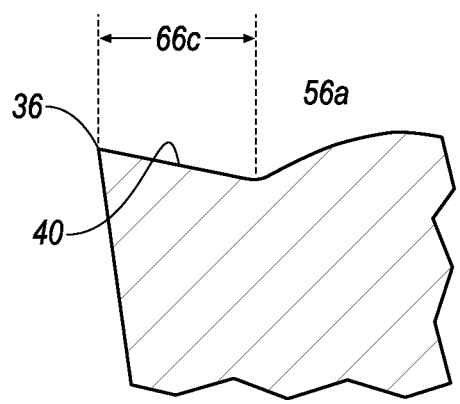
FIG. 6 shows a cross-sectional view of the cutting insert taken along line 6-6 of FIG. 2.
Figure 7:
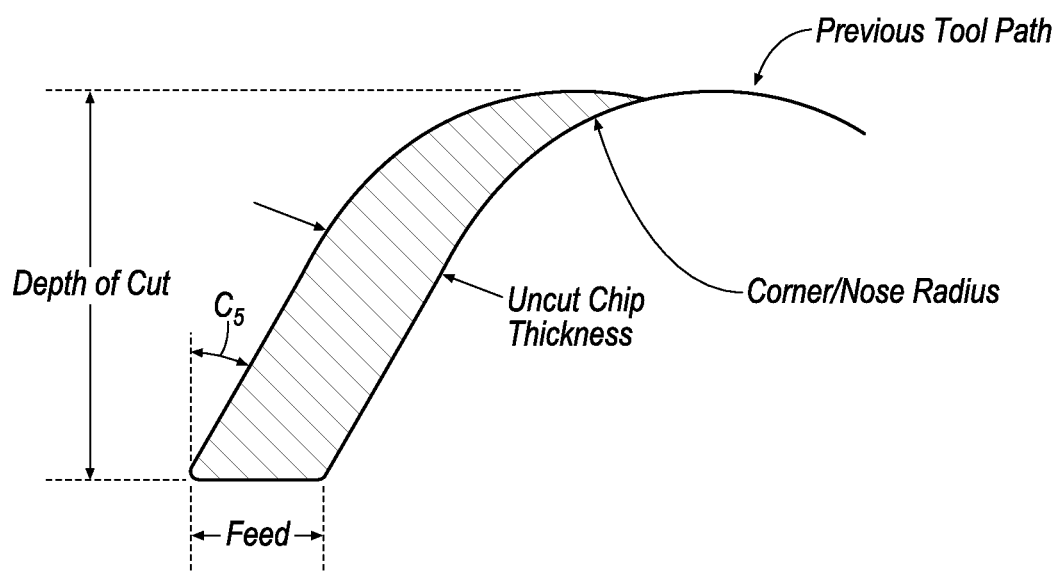
FIG. 7 shows a graphical representation of chip thickness as a function of depth of cut for a typical turning operation.

In a typical turning operation, the chip thickness varies along the cutting corners 24, 26, 28, 30, as shown in FIG. 7. Referring now to FIGS. 4-6, the asymmetry of the chip formers 54, 56 results in a distance 66 between the cutting corners 24, 28 and the chip formers 54, 56 varies in such a way that a ratio of a chip thickness and the distance (66) is substantially constant as a function of a depth of cut. Specifically, the distance 66a between the cutting corner 28 and the chip former 56 along the bisector 58 passing through the central axis 60, as shown in FIG. 4, is greater than a distance 66c between the cutting corner 28 and the chip former 56 proximate the cutting edge 36 extending from one end 28a of the cutting corner 28, as shown in FIG. 6. However, the distance 66a is less than a distance 66b between the cutting corner 28 and the chip former 56 proximate the cutting edge 38 extending from the other end 28b of the cutting corner 28, as shown in FIG. 5. For example, the distance 66a may be about 0.038 inch (0.96 mm), the distance 66b may be about 0.043 inch (1.09 mm), and the distance 66c may be about 0.023 inch (0.58 mm). This variation in the distance 66 between the cutting corners 24, 28 and the asymmetric chip formers 54, 56 has been found to increase the probability of the chip contacting the back wall 46 and breaking at low depths of cut, thereby providing superior chip formation.

In addition, the cutting insert 10 may include two asymmetric chip formers 68, 70 proximate the opposite rounded cutting corners 26, 30, respectively. The chip formers 68, 70 may be identical in shape to the chip formers 54, 56, or may be different in shape, as shown in FIGS. 1 and 2. Similar to the chip formers 54, 56, a bisector 72 passing through the opposite rounded corners 26, 30 and through the central axis 60 of the cutting insert 10 forms an angle 74 with respect to a bisector 76 passing through the asymmetric chip former 68, 70.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting insert, comprising:
    a top surface, a bottom surface and a plurality of peripheral side surfaces, the top and bottom surfaces and two of the side surfaces being joined to form a rounded cutting corner;
    a plurality of cutting edges formed at an intersection between the top surface and the plurality of side surfaces;
    a rake face sloping inwardly and downwardly from the plurality of cutting edges at a non-zero angle with respect to a plane parallel to the top surface, the rake face extending entirely around the periphery of the cutting insert;
    an upward sloping back wall extending upwardly from the bottom of the rake face to a central, substantially planar plateau of the top surface; and
    an asymmetric chip former proximate the rounded cutting corner and extending from the rake face to the central, substantially planar plateau,
    wherein a first distance between the rounded cutting corner and the asymmetric chip former along a bisector passing through a central axis is greater than a second distance between the rounded cutting corner and the asymmetric chip former proximate one of the plurality of cutting edges extending from one end of the cutting corner, and less than a third distance between the rounded cutting corner and the asymmetric chip former proximate another one of the plurality of cutting edges extending from the other end of the cutting corner such that a ratio of a chip thickness and the first, second and third distances is substantially constant as a function of a depth of cut,
    wherein a bisector passing through the rounded cutting corner and a central axis of the cutting insert forms a non-zero angle with respect to a bisector passing through the asymmetric chip former, and
    wherein, with respect to a plane parallel to the top surface, the asymmetric chip former exhibits symmetry about the bisector passing through the asymmetric chip former.

2. The cutting insert according to claim 1, wherein the asymmetric chip former is defined by an upward sloping arcuate side wall that rises from the rake face to the central plateau that forms a top surface of the chip former.

3. The cutting insert according to claim 1, wherein the non-zero angle of the rake face is in a range between 5 degrees to 15 degrees.

4. The cutting insert according to claim 1, wherein the central plateau is higher in elevation than the plurality of cutting edges.

5. The cutting insert according to claim 1, wherein the cutting insert is parallelogram in shape.

6. A cutting insert, comprising:
a top surface, a bottom surface and a plurality of peripheral side surfaces, the top and bottom surfaces and the side surfaces being joined to form rounded cutting corners;
a plurality of cutting edges formed at an intersection between the top surface and the plurality of side surfaces;
a rake face sloping inwardly and downwardly from the plurality of cutting edges at a non-zero angle with respect to a plane parallel to the top surface, the rake face extending entirely around the periphery of the cutting insert;
an upward sloping back wall extending upwardly from the bottom of the rake face to a central, substantially planar plateau of the top surface; and
a pair of asymmetric chip formers proximate opposite rounded cutting corners,
wherein a distance between the opposite rounded cutting corners and the chip formers varies in such a way that a ratio of a chip thickness and the distance is substantially constant as a function of a depth of cut,
wherein a first bisector passing through the opposite rounded cutting corners and a central axis of the cutting insert forms a non-zero angle with respect to each of second and third bisectors that, respectively, pass through each of the asymmetric chip formers.

7. The cutting insert according to claim 6, wherein a distance between the rounded cutting corner and the asymmetric chip former along a bisector passing through a central axis is greater than a distance between the rounded cutting corner and the asymmetric chip former proximate one of the plurality of cutting edges extending from one end of the cutting corner, and less than a distance between the rounded cutting corner and the asymmetric chip former proximate another one of the plurality of cutting edges extending from the other end of the cutting corner.

8. The cutting insert according to claim 6, wherein the asymmetric chip formers are defined by an upward sloping arcuate side wall that rises from a rake face to a central plateau that forms a top surface of the chip former.

9. The cutting insert according to claim 6, wherein the non-zero angle is in a range between 5 degrees to 15 degrees.

10. The cutting insert according to claim 6, wherein the central plateau is higher in elevation than the plurality of cutting edges.

11. The cutting insert according to claim 6, wherein the cutting insert is parallelogram in shape.

12. The cutting insert according to claim 6, wherein, with respect to a plane parallel to the top surface, each asymmetric chip former exhibits symmetry about a corresponding one of the second and third bisectors.

13. The cutting insert according to claim 6, wherein the asymmetric chip formers are identical to one another.

14. The cutting insert according to claim 6, wherein:
said pair of asymmetric chip formers comprises a first pair of asymmetric chip formers; and
said cutting insert further comprises a second pair of asymmetric chip formers proximate a second pair of opposite rounded cutting corners.

15. The cutting insert according to claim 14, wherein a fourth bisector passing through the second pair of opposite rounded cutting corners and a central axis of the cutting insert forms a non-zero angle with respect to each of fifth and sixth bisectors that, respectively, pass through each chip former in the second pair of asymmetric chip formers.

16. The cutting insert according to claim 15, wherein, with respect to a plane parallel to the top surface, each chip former in the second pair of asymmetric chip formers exhibits symmetry about a corresponding one of the fifth and sixth bisectors.

17. The cutting insert according to claim 15, wherein the chip formers in the second pair of asymmetric chip formers are identical to one another.

18. The cutting insert according to claim 15, wherein the chip formers in the second pair of asymmetric chip formers are not identical to either of the chip formers in the first pair of asymmetric chip formers.

19. The cutting insert according to claim 14, wherein the cutting insert is parallelogram in shape.

* * * * *